Oct. 2, 1928.                                                           1,686,094
                          F. W. MANNING
        PROCESS OF AND APPARATUS FOR CONTINUOUS COUNTERCURRENT FILTRATION
                     Filed June 21, 1927         2 Sheets-Sheet 1
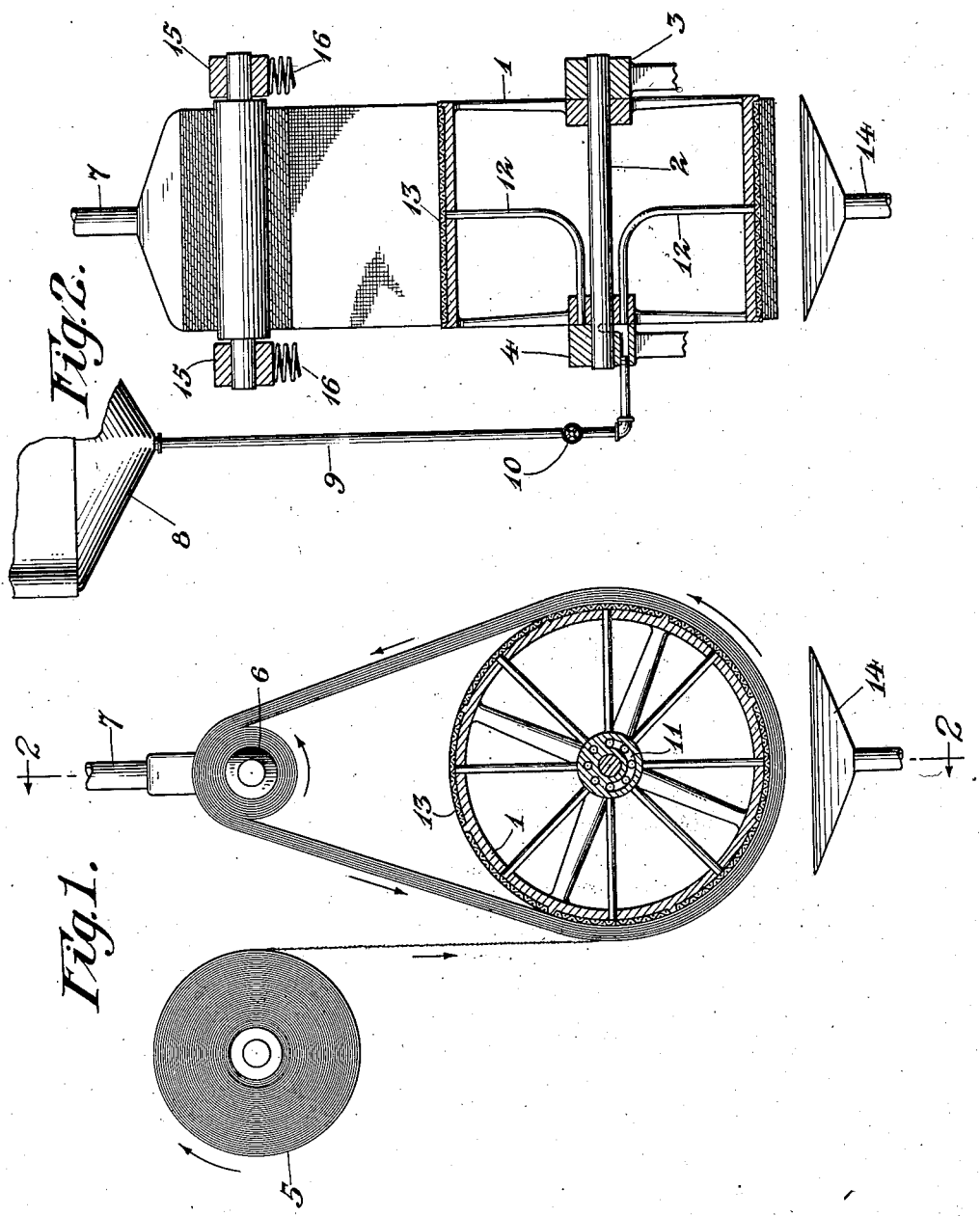
Inventor
Fred W. Manning

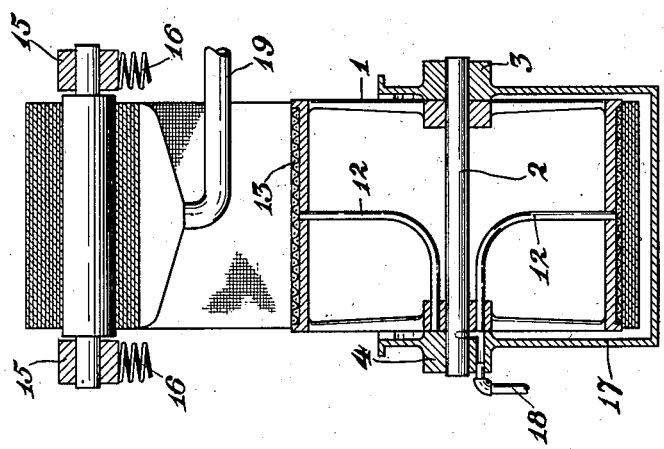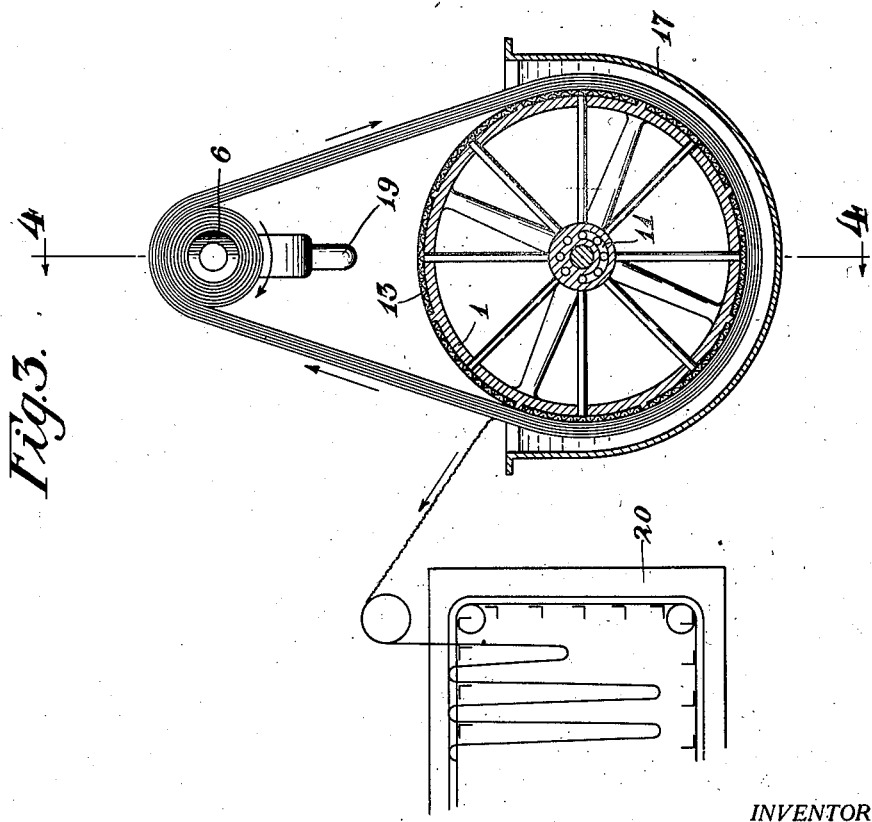

Patented Oct. 2, 1928.

1,686,094

UNITED STATES PATENT OFFICE.

FRED W. MANNING, OF BERKELEY, CALIFORNIA.

PROCESS OF AND APPARATUS FOR CONTINUOUS COUNTERCURRENT FILTRATION.

Application filed June 21, 1927. Serial No. 200,357.

This invention relates to improvements in the continuous treatment of fluids and solids by filtration for the purposes of clarification, decolorization, revivification, extraction, catalysis, precipitation of solids from fluids and for other purposes where it is desirable to contact fluids with solids or vice versa.

It has been the practice heretofore to accomplish the clarification of liquids by means of one thickness or layer of fabric, and if the liquid happened to be of a slimy, mucilaginous, or colloidal character or otherwise difficult to filter, the one thickness was first given a thin precoating of some treating agent, such as kieselguhr or other porous substance so that by means of the collection of the impurities on or through the depth of the thin coating, clarity and a better rate of filtrate flow could be obtained. Unfortunately by such methods the cloudy filtrate or filter cake forming period results in considerable lost time, the rate of filtrate flow is exceedingly slow due to the cake compactness necessary for the retention of all of the impurities on or in one thickness of fabric, and its precoating if used, and the treating value of the agent is but very incompletely utilized before it must be discarded or removed for regeneration purposes. Furthermore, liquids of such character are often volatile and must be handled at high pressures and temperatures and such conditions heretofore have generally been found incompatible with continuous operations.

As distinguished from such prior methods the present invention includes the advantages of continuous operation at any desired pressure and temperature, absolute clarity at all times without any cloudy filtrate for which provision must be made, a high rate of filtrate flow due to the distribution of the impurities throughout a great many thicknesses of fabric, and the complete utilization of the layers of fabric and treating agents with which the fabric may be coated or impregnated, treating fabric through counter-current action. In my copending application Serial No. 182,925, filed April 11, 1927, I have shown how this may be accomplished by the renewal of the filter member while the latter is moving in the same direction as the fluid flow, and in the present invention I have shown how this may be accomplished by renewal of the filter member while the latter is moving in a direction opposed to the fluid flow.

In carrying out the invention, the fluid to be treated is passed through a plurality of layers of treating fabric, which are continuously renewed by the removal of the layer through which the fluid passes first and which has become practically exhausted, and the addition of a fresh layer to the layer through which the fluid passes last, at which time the fluid has already been treated. In this way the treatment is carried out with a maximum of effectiveness.

The fabric may consist of a reinforcing medium such as wire screen, textile scrim, parallel threads of wire, cotton or other substance, in the mesh or between the threads of which paper pulp of wood fibres, cotton linters, asbestos etc. or a combination of them is incorporated, and the paper pulp either before or after being amalgamated with the reinforcing medium may be impregnated with other treating agents such as clay or carbon for decolorizing purposes or other agents for other purposes as described in my copending applications Serial Numbers 182,926 and 187,673, filed April 1, 1927 and April 29, 1927 respectively.

The invention is exemplified in the following description, and one form of apparatus for carrying out the process is illustrated by way of example in the accompanying drawings, in which:

Figure 1 is a transverse sectional view of the filter drum and windings, showing construction for movement of the windings toward the filter drum.

Figure 2 is a vertical sectional elevation taken on line 2—2 of Figure 1.

Figure 3 is a transverse sectional view of the filter drum and windings showing construction for movement of the windings away from the filter drum.

Figure 4 is a vertical sectional elevation taken on line 4—4 of Figure 3.

Referring more specifically to the drawings by reference characters: The filter drum 1 is supported on shaft 2 which revolves in bearings 3 and 4 and is driven by a source of power not shown. The arrangement indicated in Figures 1 and 2 shows how the scrim or other fabric from the reserve roll 5 may be fed onto the outside of the filter drum and after passing around the drum and extension roll 6 a sufficient number of times, may be gradually removed by allowing the inner or most contaminated winding to be wound upon the extension roll, which may be driven either by means of the windings passing around the driven filter drum or from an independent source of power not shown. The treating agents such as a fibrous material of the order of cotton linters, asbestos, wood pulp, etc., which may be impregnated with a clay or carbon or other substance for decolorizing or other purification purposes, may be formed into a plastic or semi-liquid pulp by the addition of a sufficient amount of the filtered liquid and then fed through the spreader tube 7 under gravity or other pressure necessary to carry the pulp into the mesh of the fabric. The liquid to be filtered passes from storage tank 8 through pipe connection 9 controlled by valve 10 into the valve port 11, which distributes it through pipe connections 12 to those distribution compartments 13 which are in contact with the windings, and after passing through the windings the filtered liquid is collected by funnel 14 and carried off to a suitable reservoir not shown. As the outer windings move toward the filter drum the distance between the centers of the extension roll and the filter drum may vary and therefore the extension roll is supported on movable bearings 15 and the latter is supported by suitable adjusting or regulating means such as springs 16.

In instances where considerable solids are to be eliminated from the liquid to be filtered, the construction as shown in Figures 3 and 4 is used, in which the sludge may be pumped into the drum container 17, and the liquid caused to be passed through the windings in the reverse way, collected in the now called drainage compartments 13, conveyed through pipe connections 12, valve port 11, and out through pipe 18, by means of suction exerted in the latter. In this case the reserve roll of scrim is wound upon the extension roll, the treating agents are fed into the mesh of the scrim through the spreader tube 19, and the fabric with the filtered out solids, is carried out of the drum container and passed through a furnace or other chamber 20 for drying, revivification or other treatment of the solids. It will be noted that the port 11, in bearing 4 is so constructed that passage of the liquid through the distribution or drainage compartments 13, is only accomplished while they are in contact with the windings and immediately they leave contact with the windings the port 11 is cut off and ceases to have further connection with these compartments until they again come into contact with the windings.

It will thus be seen from the foregoing description that solids may be continuously filtered out of a liquid by means of a filter member, a surface portion of which can then be used as a conveyor to convey the filtered out solids to a drying or other treating chamber, and at the same time a fresh portion added to the fluid inlet side of the filter member thereby maintaining the filter member in a constant condition for filtration purposes.

It will also be evident that after the solids have been conveyed in sheet form by a portion of the filter member to a drying or other treating chamber, the solids may be removed from the fabric conveyor in any suitable manner, as by scraping or turning the fabric over to let the solids drop by their own weight, after which the fabric may be returned to the filtering apparatus for further use. Or the solids may be conveyed in sheet form to another similar filtering apparatus and after passing around the filter drum and extension roll a sufficient number of times, the solids may be continuously removed from the inner winding by scraping or other suitable means, and the fabric wound upon the extension roll.

Having thus described my invention, what I claim is:

1. A filtering process which comprises passing a fluid through a constantly renewing filter member formed of layers of treating material, the said member moving continuously in a direction opposed to the flow of the fluid.

2. A filtering process consisting of passing a fluid through a filter member having a plurality of layers of treating material, simultaneously advancing the member in a direction opposed to the flow of the fluid, and continuously removing the fluid inlet surface layer.

3. A filtering process consisting of passing a fluid through a filter member having a plurality of layers of treating material, and continuously renewing and simultaneously advancing the said layers in a direction opposed to the flow of the fluid.

4. A filtering process consisting of passing a fluid through a filter member having a plurality of layers of treating material, and renewing said layers by the removal of the contaminated layers and the addition of fresh layers in a direction opposed to the flow of the fluid.

5. A filtering process in a filtering apparatus which comprises a plurality of layers of treating material, said process consisting in passing a fluid through said layers, continuously renewing said layers by the removal of the contaminated layers and the addition of fresh layers in a direction opposed to the flow of the fluid.

6. A filtering process consisting of passing a fluid through a filter member having a plurality of layers of fabric in which is incorporated a treating agent, removing the fluid inlet surface layer of the member to provide fresh filtering surface to the fluid to be filtered, adding a fresh layer of fabric to the fluid outlet surface layer of the member, and simultaneously incorporating fresh treating agent in the fluid outlet surface layers of the member.

7. A filtering process consisting of passing a fluid through a filter member having a plurality of layers of treating material, moving in a direction opposed to the flow of the fluid, building up the filtered out solids on the fluid inlet surface layer, removing the said inlet layer to form a conveyor for the filtered out solids, and simultaneously adding a fresh layer of treating material to the fluid outlet surface layer of the member.

8. In a filtering apparatus, a filter member comprising a plurality of layers of treating material, means for passing a fluid to be treated through the said layers, and means for renewing the said layers in a direction opposed to the flow of the fluid.

9. In a filtering apparatus, a filter member comprising a plurality of layers of treating material, means within the filter member cooperating therewith for adding to the inner surface portion of the member, and means exteriorly of the member for removing the exterior surface portion of the member.

10. In a filtering apparatus, a filter drum and an extension roll around which passes a filter member comprising a plurality of layers of treating material, means for passing a fluid to be treated through the member, means for adding a fresh layer of treating material to the fluid outlet surface layer of the member, and means for removing the fluid inlet surface layer of the member.

11. In a filtering apparatus, a filter member comprising a plurality of layers of treating material, means for passing a fluid to be treated through the said member, means within the member cooperating therewith for adding a fresh layer of treating material to the fluid outlet surface layer of the member, and means exteriorly of the member for removing the fluid inlet surface layer of the member.

12. In a filtering apparatus, a filter member comprising a plurality of layers of treating material, an extension member connected to the inner end of the fabric, means for rotating the extension and filter members to remove a fresh portion of treating material from the extension member and to add the said fresh portion to the filter member.

FRED W. MANNING.